United States Patent
Mori et al.

(10) Patent No.: US 10,354,259 B2
(45) Date of Patent: Jul. 16, 2019

(54) NON-TRANSITORY COMPUTER-READABLE STORAGE MEDIUM, DISPLAY CONTROL METHOD, AND INFORMATION PROCESSING DEVICE

(71) Applicant: FUJITSU LIMITED, Kawasaki-shi, Kanagawa (JP)

(72) Inventors: Akito Mori, Shibuya (JP); Keisuke Fujita, Sumida (JP); Ikko Aoyama, Yokohama (JP); Naoyuki Echizenya, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/798,980

(22) Filed: Oct. 31, 2017

(65) Prior Publication Data

US 2018/0121935 A1     May 3, 2018

(30) Foreign Application Priority Data

Nov. 2, 2016    (JP) ................................. 2016-215565

(51) Int. Cl.
    *G06Q 30/02*       (2012.01)
    *G06F 16/957*      (2019.01)
    *H04N 1/00*        (2006.01)

(52) U.S. Cl.
    CPC ......... *G06Q 30/02* (2013.01); *G06F 16/9577* (2019.01); *G06Q 30/0251* (2013.01);
(Continued)

(58) Field of Classification Search
    CPC .......................... G06F 17/30905; G06Q 30/02
(Continued)

(56) References Cited

U.S. PATENT DOCUMENTS 9,396,165 B2 *   7/2016   Takami ................ G06F 17/211
2004/0261010 A1    12/2004   Matsuishi
(Continued)

FOREIGN PATENT DOCUMENTS

EP        2500860 A1     9/2012
JP       2004-318842     11/2004
(Continued)

OTHER PUBLICATIONS

EESR—The Extended European Search Report of European Patent Application No. 17199126.8 dated Jan. 8, 2018. ** US2009/044145A1 cited in the EESR was previously submitted in the IDS filed Oct. 31, 2017.

*Primary Examiner* — William D Titcomb
(74) *Attorney, Agent, or Firm* — Fujitsu Patent Center

(57) ABSTRACT

A non-transitory computer-readable storage medium storing a display control program that causes a computer to execute a process, the process including, monitoring an operation of a user for one or a plurality of display contents displayed on a screen, determining whether a result of the monitoring corresponds to at least one of a plurality of operation patterns stored in a memory, and outputting, on the screen, information corresponding to the one or the plurality of display contents when the result of the monitoring corresponds to the at least one of the plurality of operation patterns, the information being different in accordance with which operation pattern, included in the plurality of operation patterns, corresponds to the result of the monitoring.

12 Claims, 8 Drawing Sheets

(52) U.S. Cl.
CPC ..... *H04N 1/00233* (2013.01); *H04N 1/00464* (2013.01); *H04N 2201/0094* (2013.01)

(58) Field of Classification Search
USPC ........................................................ 715/804
See application file for complete search history.

(56) References Cited

U.S. PATENT DOCUMENTS

| | | | | |
|---|---|---|---|---|
| 2006/0069618 | A1* | 3/2006 | Milener | G06F 17/30902 705/14.73 |
| 2007/0100800 | A1* | 5/2007 | Rose | G06F 17/30395 |
| 2009/0019061 | A1* | 1/2009 | Scannell, Jr. | G06F 17/30905 |
| 2009/0044145 | A1 | 2/2009 | Seo | |
| 2010/0250553 | A1* | 9/2010 | Higuchi | G06F 17/3028 707/748 |
| 2011/0072114 | A1* | 3/2011 | Hoffert | G06F 17/30905 709/219 |
| 2012/0240079 | A1* | 9/2012 | Takami | G06F 3/0488 715/784 |
| 2012/0278742 | A1* | 11/2012 | Takami | G06Q 30/02 715/760 |
| 2013/0073951 | A1* | 3/2013 | Takami | G06F 3/0481 715/243 |
| 2013/0091463 | A1* | 4/2013 | Nordstrom | G06F 17/30905 715/810 |
| 2014/0082133 | A1* | 3/2014 | Dolph | G06Q 30/02 709/217 |
| 2014/0089787 | A1* | 3/2014 | Takami | G06F 3/14 715/234 |
| 2014/0173503 | A1* | 6/2014 | Catania | G06F 17/30905 715/781 |
| 2014/0189558 | A1* | 7/2014 | Takami | G06F 3/0481 715/767 |
| 2016/0078526 | A1* | 3/2016 | Nations | G06Q 30/02 705/27.2 |

FOREIGN PATENT DOCUMENTS

| | | |
|---|---|---|
| JP | 2009-524847 | 7/2009 |
| JP | 2010-015292 | 1/2010 |
| JP | 2011-128204 | 6/2011 |
| JP | 2016-136258 | 7/2016 |

* cited by examiner

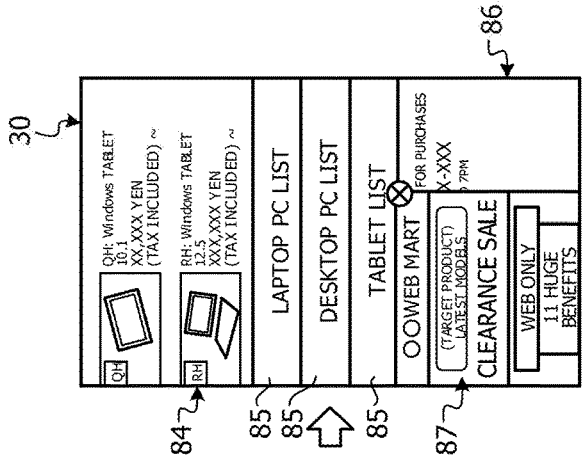
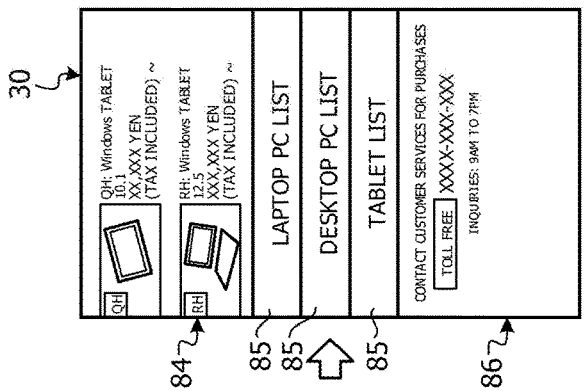
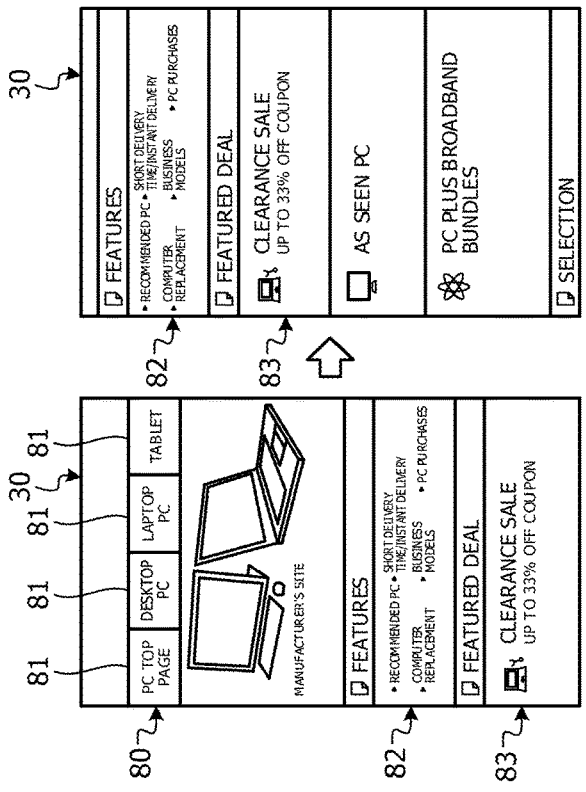

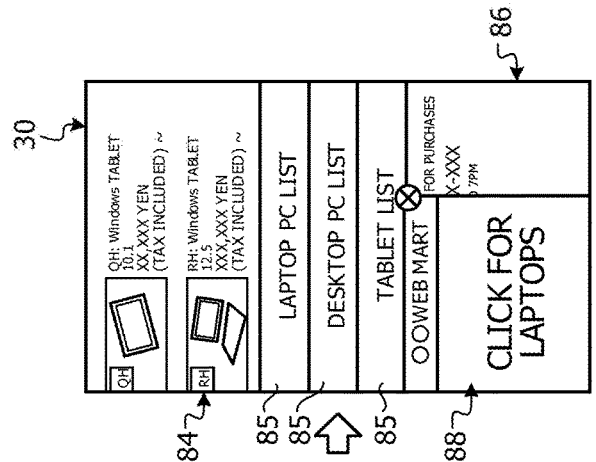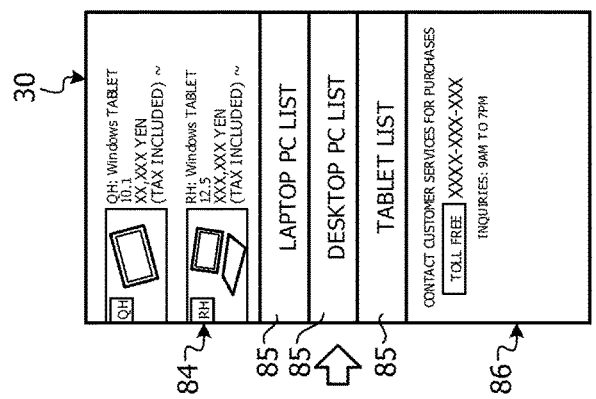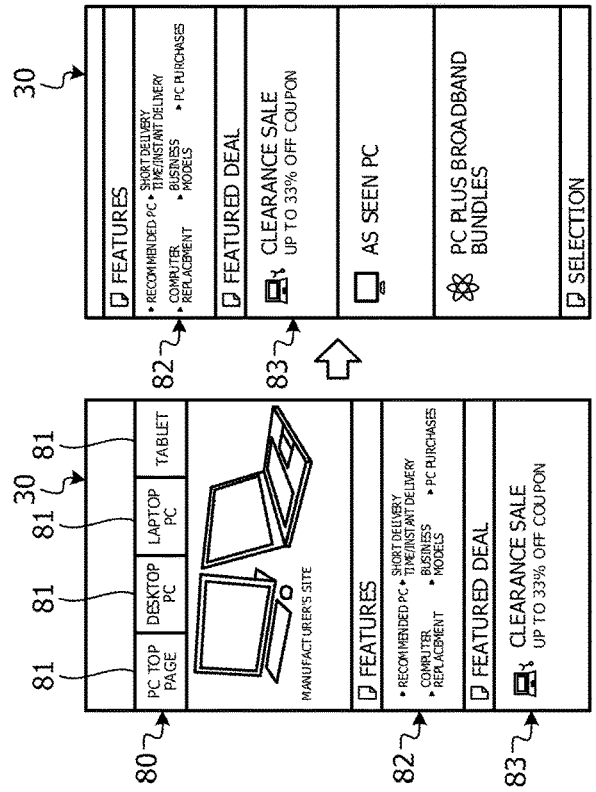
FIG. 4A  FIG. 4B  FIG. 4C  FIG. 4D

NON-TRANSITORY COMPUTER-READABLE STORAGE MEDIUM, DISPLAY CONTROL METHOD, AND INFORMATION PROCESSING DEVICE

CROSS-REFERENCE TO RELATED APPLICATION

This application is based upon and claims the benefit of priority of the prior Japanese Patent Application No. 2016-215565, filed on Nov. 2, 2016, the entire contents of which are incorporated herein by reference.

FIELD

The embodiments discussed herein are related to a non-transitory computer-readable storage medium, a display control method, and an information processing device.

BACKGROUND

In the related art, a technology is known by which information of an advertisement or the like is displayed with contents such as an article and an image in a web (World Wide Web) page. In such a technology, for example, an advertisement display area is provided in the web page, and an advertisement related to the displayed content is displayed.

The related art is discussed in Japanese National Publication of International Patent Application No. 2009-524847.

SUMMARY

According to an aspect of the invention, a non-transitory computer-readable storage medium storing a display control program that causes a computer to execute a process, the process including, monitoring an operation of a user for one or a plurality of display contents displayed on a screen, determining whether a result of the monitoring corresponds to at least one of a plurality of operation patterns stored in a memory, and outputting, on the screen, information corresponding to the one or the plurality of display contents when the result of the monitoring corresponds to the at least one of the plurality of operation patterns, the information being different in accordance with which operation pattern, included in the plurality of operation patterns, corresponds to the result of the monitoring.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A to 3D are diagrams illustrating an example of a screen on which a web page is displayed;

FIGS. 4A to 4D are diagrams illustrating an example of a screen on which the web page is displayed;

DESCRIPTION OF EMBODIMENTS

However, in the technology of the related art, the advertisement related to the displayed content may be displayed, but it is difficult to take a measure corresponding to an operation history of each user who refers to the web page.

An object of an aspect of the embodiment is to provide a display control program by which a display screen corresponding to an operation history of each user is controlled, a display control method, and an information processing device.

Embodiments of the display control program, the display control method, and the information processing device of the technology discussed herein are described below in detail with reference to the drawings. The technology discussed herein is not limited to such embodiments. In addition, the following embodiments may be combined as appropriate in a range in which the content is not contradicted.

EMBODIMENTS

Figure 1:
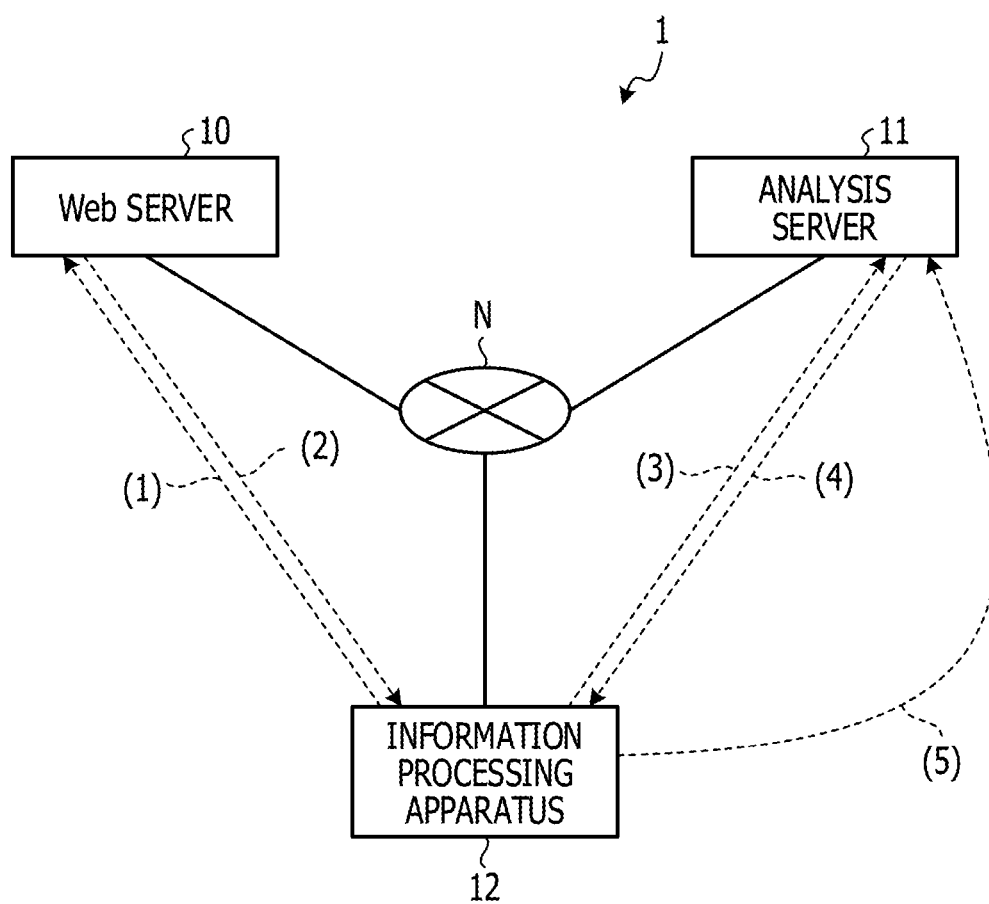
FIG. 1 is a diagram illustrating an example of a configuration of a display control system according to an embodiment.

FIG. 1 is a diagram illustrating an example of a configuration of a display control system according to an embodiment. A display control system 1 illustrated in FIG. 1 is a system that controls display of information. For example, the display control system 1 controls display of information additionally displayed on a screen on which a web page is displayed. The display control system 1 includes a web server 10, an analysis server 11, and an information processing device 12. The web server 10, the analysis server 11, and the information processing device 12 are coupled to each other through a network N so as to communicate with each other. As such a network N, a certain type of a communication network such as the Internet, a local area network (LAN), or a virtual private network (VPN) may be used regardless of whether the network uses a wired communication or a wireless communication.

The web server 10 is a server device that provides various contents. In the embodiment, a case in which the web server 10 provides a web site through which a content is displayed is described below as an example. For example, the web server 10 provides a web site such as an online shop through which products are sold over the Internet. The web server 10 transmits, to a request source, data of the web page including contents such as articles and images of products to be sold, in response to a request. The data of the web page provided by the web server 10 includes a code of a tag or the like, which requests transmission of a display control program described later and the access destination of which is the analysis server 11.

The analysis server 11 is a server device that provides information additionally displayed on the web page of the web site provided by the web server 10. In the embodiment, a case in which an advertisement is provided as the additionally-displayed information by the analysis server 11 is described below as an example. The analysis server 11 stores a display control program by which display of an advertisement is controlled, for each web page on which the advertisement is displayed. In such a display control program, a condition in which the advertisement is displayed and information on the advertisement to be displayed are described, for example, in a script language such as JavaScript (registered trademark), and the display control program is operated so as to be executed on a web browser. The condition in which the advertisement is displayed is defined as an operation pattern for the screen on which the web page is displayed. The analysis server 11 accepts a transmission request of a display control program, which includes identification information on a web page. When the analysis server 11 has accepted the transmission request of a display control program, the analysis server 11 transmits a display control program corresponding to the web page of the identification information, to the request source. Such identification information on the web page may be information by which the web page is identified, and may be, for example, a uniform resource locator (URL) of the web page.

The information processing device 12 is a terminal device used by the user. For example, as the information processing device 12, a mobile terminal device such as a smartphone or a tablet terminal may be used. In addition, as the information processing device 12, for example, a computer such as a personal computer may also be used. In the information processing device 12, a web browser is installed.

The user accesses the web site using the web browser of the information processing device 12. For example, when the user purchases a product, the user accesses the web site provided by the web server 10 using the web browser of the information processing device 12 (FIG. 1 (1)).

The web server 10 transmits data of the web page including contents such as an article and an image of the product to be sold, to the information processing device 12, in response to the access from the information processing device 12 (FIG. 1 (2)). In the information processing device 12, the data of the web page, which has been received from the web server 10, is temporarily stored in a storage unit such as a random access memory (RAM). In addition, in the information processing device 12, the data of the web page is read by the web browser, and the web page is displayed through the web browser. In addition, in the information processing device 12, a code included in the data of the web page is executed by the web browser, and a transmission request of a display control program, which includes identification information on the web page is transmitted to the analysis server 11 (FIG. 1 (3)). The analysis server 11 transmits a display control program corresponding to the web page of the identification information included in the transmission request, to the request source (FIG. 1 (4)). In the information processing device 12, the received display control program is temporarily stored in the storage unit such as the RAM. In addition, in the information processing device 12, the display control program is read and executed by the web browser, and display of an advertisement is controlled. In addition, in the information processing device 12, operation information for the screen is transmitted to the analysis server 11 through the web browser (FIG. 1 (5)). Such operation information for the screen includes, for example, information on an operation detected for the screen such as information on a scroll operation for the screen, identification information on the displayed web page, an operation result for the advertisement, and information indicating whether or not the advertised product is purchased.

The analysis server 11 modifies the display control program corresponding to the web page of the identification information in accordance with the operation information for the screen. For example, the analysis server 11 modifies the advertisement displayed by the display control program and an operation pattern for displaying the advertisement so that a link to the most referenced product is displayed as an advertisement in an operation history including the transition recently led to a key goal indicator (KGI). In addition, for example, for each advertisement, the analysis server 11 accumulates an operation result for the advertisement and information indicating whether or not the product is purchased. In addition, the analysis server 11 modifies the advertisement displayed by the display control program and the operation pattern for displaying the advertisement so that an advertisement with the highest effect for product purchase is displayed.

That is, the information processing device 12 detects an operation for the screen on which the web page is displayed. The information processing device 12 determines whether a history of the operation detected from a single web page or a plurality of web pages corresponds to a specific pattern. When the history of the operation corresponds to the specific pattern, the information processing device 12 changes the display mode of the screen. Accordingly, the information processing device 12 may take a measure corresponding to an operation of each of users who refer to the web page.

Figure 2:
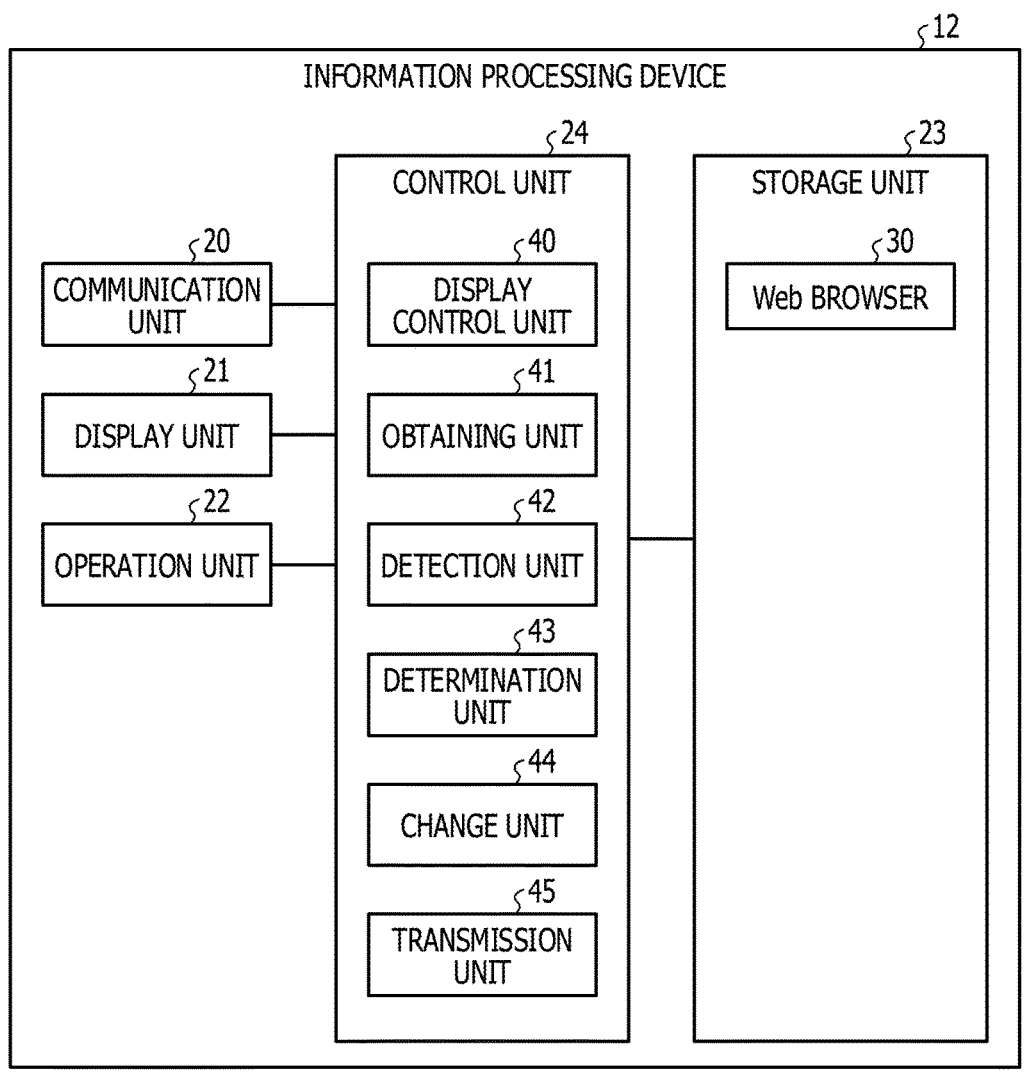
FIG. 2 is a block diagram illustrating an example of a configuration of an information processing device according to the embodiment.

A configuration of the information processing device 12 is described below. FIG. 2 is a block diagram illustrating an example of a configuration of the information processing device according to the embodiment. As illustrated in FIG. 2, the information processing device 12 includes a communication unit 20, a display unit 21, an operation unit 22, a storage unit 23, and a control unit 24. The information processing device 12 may include various function units included in a known computer other than the function units illustrated in FIG. 2.

The communication unit 20 is realized, for example, by a network interface card (NIC) or the like. The communication unit 20 is a communication interface that is coupled to the web server 10 and the analysis server 11 through the network N by a wired communication or a wireless communication and controls communication of information with the web server 10 and the analysis server 11.

The display unit 21 is a display device that displays various types of information. An example of the display unit 21 includes a display devise such as a liquid crystal display (LCD) or a cathode ray tube (CRT). The display unit 21 displays various types of information and an operation screen in response to an operation from the operation unit 22.

The operation unit 22 is an input device that accepts various operation inputs. For example, examples of the operation unit 22 include input devices such as a mouse, a keyboard, various buttons provided on the information processing device 12, and a transmissive touch sensor provided on the display unit 21. The operation unit 22 outputs operation information indicating the accepted operation content to the control unit 24. In the example of FIG. 2, in order to illustrate the functional configuration, the display unit 21 is separated from the operation unit 22, but for example, a device such as a touch panel in which the display unit 21 and the operation unit 22 are provided integrally may be configured.

The storage unit 23 is realized, for example, by a semiconductor memory element such as a RAM or a flash memory or a storage device such as a hard disk or an optical disk. The storage unit 23 stores a web browser 30. In addition, the storage unit 23 stores information used for processing of the control unit 24.

The web browser 30 is browsing software used to display information on a web page on the Internet on the screen.

The control unit 24 is realized, for example, when a central processing unit (CPU), a micro processing unit (MPU), or the like, executes a program stored in an internal storage device using the RAM as a work area. In addition, the control unit 24 may be realized, for example, by an integrated circuit such as an application specific integrated circuit (ASIC) or a field programmable gate array (FPGA). The control unit 24 functions as various processing units when various programs are operated. For example, the control unit 24 includes a display control unit 40, an obtaining unit 41, a detection unit 42, a determination unit 43, a change unit 44, and a transmission unit 45, and realizes or executes a function and an operation of information processing described below. The internal configuration of the control unit 24 is not limited to the configuration illustrated in FIG. 2, and another configuration may be used as long as the information processing described later is executed.

The display control unit 40 performs display control of various types of information on the display unit 21. For example, the display control unit 40 controls various types of information to be displayed on the display unit 21 in response to an operation input accepted through the operation unit 22. For example, when activation of the web browser 30 is instructed, the display control unit 40 reads the web browser 30 from the storage unit 23, executes the web browser 30, and displays the screen of the web browser 30 on the display unit 21. In addition, the display control unit 40 accesses a web site in response to an operation input to the web browser 30, which has been accepted through the operation unit 22, and displays a screen of a web page received through the web site on the web browser 30. For example, the display control unit 40 accesses the web server 10 and displays a web page including contents such as an article and an image of a product to be sold. Data of the web page provided by the web server 10 includes a code that is used to request transmission of a display control program and the access destination of which is the analysis server 11.

The obtaining unit 41 obtains various types of information. For example, the obtaining unit 41 executes the code included in the web page provided by the web server 10 and transmits, to the analysis server 11, a transmission request of a display control program, which includes identification information on the web page. Accordingly, in response to the transmission request, the analysis server 11 transmits, to the request source, a display control program corresponding to the web page of the identification information. The obtaining unit 41 obtains the display control program from the analysis server 11 through the network N and the communication unit 20. Such a display control program functions as the detection unit 42, the determination unit 43, the change unit 44, and the transmission unit 45 when the display control program is temporarily stored in the storage unit 23 and is operated on the web browser 30. In such a display control program, a pattern having a condition in which an advertisement is displayed and information on the advertisement to be displayed in accordance with the pattern are stored.

The detection unit 42 detects an operation for the screen on which the web page is displayed, based on the operation information from the operation unit 22. For example, the detection unit 42 detects a scroll operation for the screen on which the web page is displayed. For example, the detection unit 42 detects an orientation and a distance in which the scroll operation has been performed on the screen on which the web page is displayed by periodically detecting whether or not an operation for the screen is performed and the operation position when the operation has been performed. For example, when the operation unit 22 accepts a touch operation, the detection unit 42 detects a scroll operation for the screen by detecting that the touch operation has been performed on the screen of the display unit 21 on which the web page is displayed, and that a movement operation has been performed during the touch state. In addition, for example, when there is a scroll bar on the screen of the display unit 21 on which the web page is displayed, the detection unit 42 detects the scroll operation for the screen by detecting that the scroll bar has been selected and a movement operation of the scroll bar has been performed during the selection state. The detection unit 42 may detect another operation. For example, the detection unit 42 may detect an orientation (vertical, horizontal) of the information processing device 12, coordinates at which a touch operation has been performed, a start time of the touch operation, an end time of the touch operation, or a time period of the touch operation based on the start time and the end time of the touch operation. In addition, the detection unit 42 may detect whether or not a swipe operation is performed and an orientation and a distance in which the swipe operation has been performed. In addition, the detection unit 42 may detect a pinch-in operation or pinch-out operation.

The determination unit 43 determines whether a history of the operation detected from a single web page or a plurality of web pages by the detection unit 42 corresponds to a specific pattern. For example, the determination unit 43 determines whether the detected history of the operation corresponds to a specific pattern having a condition in which an advertisement stored in the display control program is displayed. For example, the determination unit 43 obtains a flow line of the operation from the history of the operation detected by the detection unit 42. For example, the determination unit 43 obtains the flow line of the operation on the screen on which the web page is displayed. The flow line of the operation may be obtained from a single web page or a plurality of web pages. The flow line of the operation is also called an in-site flow line. The determination unit 43 determines whether the flow line of the operation corresponds to the specific pattern.

For example, the determination unit 43 obtains an average speed of the scroll operation for each of specific ranges of the web page displayed on the screen, from a history of the scroll operation for the screen, which have been detected by the detection unit 42. In addition, the determination unit 43 determines whether the average speed of the scroll operation for each of the specific ranges corresponds to the specific pattern.

In addition, for example, the determination unit 43 obtains a time taken for the scroll operation of the specific range of the screen from the history of the scroll operation for the screen. In addition, the determination unit 43 determines whether the time taken for the scroll operation of the specific range is a specific time period or more.

When the determination unit 43 determines that the operation of the specific pattern has been performed, the change unit 44 performs change control of the display mode of the screen displayed on the display unit 21. For example, the change unit 44 displays information stored in the display control program in association with the specific pattern, as a popup display on the screen. In addition, for example, the change unit 44 performs change so that the information stored in the display control program in association with the specific pattern is displayed on the content displayed on the screen.

The transmission unit 45 transmits the operation information for the screen to the analysis server 11. For example, the transmission unit 45 transmits, to the analysis server 11, information on an operation detected for the screen displayed through the web browser 30 such as information on a scroll operation for the screen, identification information on the web page, an operation result for the display advertisement, and information indicating whether or not the advertised product is purchased.

Here, specific examples are described with reference to FIGS. 3 to 6. FIGS. 3A to 3D are diagrams illustrating an example of a screen on which a web page is displayed. In FIGS. 3A to 3D, an example is illustrated in which a web page of a web site through which personal computers (PCs) are sold as products is displayed through the web browser 30. The screen of the web page displayed through the web browser 30 transitions from the screen in FIG. 3A to the screen in FIG. 3C when the screen is scrolled down. As illustrated in FIG. 3A, at the top of the web page, a header part 80 is provided, and selection areas 81 such as "PC top page", "desktop PC", "laptop PC", and "tablet" are displayed on the header part 80. When the selection area 81 of "PC top page" is selected, a web page that is the top page of the web site through which the PCs are sold is displayed. When the selection area 81 of "desktop PC" is selected, a web page on which desktop PCs on sale are listed is displayed. When the selection area 81 of "laptop PC" is selected, a web page on which laptop PCs on sale are listed is displayed. When the selection area 81 of "tablet" is selected, a web page on which tablet terminals on sale are listed is displayed.

In the examples of FIGS. 3A to 3C, a screen in a state in which the selection area 81 of "PC top page" has been selected is illustrated. As illustrated in FIGS. 3A and 3B, in the web page, an area 82 of "features", an area 83 of "featured deals", and an area 84 of "selections" are provided. On the area 82 of "features", links to web pages featured in the web site are displayed. On the area 83 of "featured deals", sales campaigns being performed are displayed, and when one of the sales campaigns is selected, a web page including a product to which the selected sales campaign is applied is displayed. In the area 84 of "selections", examples of products on sale, and selection areas 85 of "laptop PC list", "desktop PC list", and "tablet list" are provided. When the selection area 85 of "laptop PC list" is selected, a web page in which laptop PCs on sale are listed is displayed. When the selection area 85 of "desktop PC list" is selected, a web page in which desktop PCs on sale are listed is displayed. When the selection area 85 of "tablet list" is selected, a web page in which tablet terminals on sale are listed is displayed. In addition, as illustrated in FIG. 3C, at the bottom of the web page, a footer part 86 on which a telephone number for a customer center is displayed is provided.

The detection unit 42 detects a scroll operation for the screen on which the web page is displayed. The determination unit 43 obtains the average speed of the scroll operation for each of the specific ranges of the web page displayed on the screen, from the history of the scroll operation for the screen, which has been detected by the detection unit 42. In addition, the determination unit 43 determines whether the average speed of the scroll operation for each of the specific ranges is increased in a second range as compared with a first range. For example, the determination unit 43 determines whether the average speed of the scroll operation for each of the specific ranges increases at the bottom of the web page as compared with the top of the web page. For example, the determination unit 43 determines whether the average speed of the scroll operation increases in the bottom range of the web page as compared with the top range of the web page. For example, in the cases of FIGS. 3A to 3C, the determination unit 43 obtains an average speed of a scroll operation for each ⅓ range of the web page, which is allowed to be displayed through the web browser 30, after the beginning of the web page has been displayed. For example, the determination unit 43 obtains a scroll time until display of the ⅓ range of the web page ends by the scroll operation after the beginning of the web page has been displayed. In addition, the determination unit 43 obtains an average scroll speed in the ⅓ range from the web page header by dividing a scroll distance in the ⅓ range of the web page by the scroll time. In addition, the determination unit 43 obtains a scroll time until display of the ⅔ range of the web page ends after the display of the ⅓ range of the web page has ended. In addition, the determination unit 43 obtains an average scroll speed in the ⅔ range of the web page by dividing a scroll distance from the ⅓ range to the ⅔ range of the web page by the scroll time from the ⅓ range to the ⅔ range. In addition, when the web page has been scrolled beyond the ⅔ range of the web page, and "(average scroll speed of the ⅓ range)/(average scroll speed of the ⅔ range)≤0.5" is satisfied, the determination unit 43 determines an average speed of the scroll operation increases at the bottom of the web page as compared with the top of the web page.

When the average speed of the scroll operation increases at the bottom of the web page as compared with the top of the web page as a result of the determination by the determination unit 43, the change unit 44 performs change so that a link to a web page of a specific category is displayed. For example, the change unit 44 performs change so that a link to a web page of a sales campaign being performed in the web site including the web page being displayed is displayed. For example, as illustrated in FIG. 3D, the change unit 44 displays a link to a web page of "clearance sale" by a popup 87. The change unit 44 may perform change so that the link to the web page of "clearance sale" is displayed on the web page displayed on the screen. In addition, the case is described above in which the change unit 44 displays the link to the web page of the sales campaign being performed, as the web page of the specific category, but the embodiment is not limited to such a case. For example, the change unit 44 may display a link to the most referenced product as an advertisement in an operation history including the transition recently led to a KGI, as the web page of the specific category.

Here, when the user refers to a web page, the user scrolls the displayed web page from the top to the bottom. In such a case, when the user is not interested in the web page so much, there is a tendency in which the scroll speed increases at the bottom of the web page as compared with the top of the web page. For example, an average speed of the scroll operation increases in the bottom range of the web page as compared with the top range of the web page. Therefore, when the average speed of the scroll operation increases at the bottom of the web page as compared with the top of the web page, the information processing device 12 displays the link to the web page of "clearance sale" by the popup 87. As a result, the information processing device 12 may cause the user who is not interested in the web page so much to be newly interested in the web page of "clearance sale", guide the user to the web page of "clearance sale", and suppress the departure of the user who is not interested in the web page so much from the web site. That is, the information processing device 12 may take a measure corresponding to an operation of each of the users who refer to the web page, based on an operation pattern when the user refers to the web page.

FIGS. 4A to 4D are diagrams illustrating an example of a screen on which the web page is displayed. In the example of FIGS. 4A to 4D, the web page of the web site through which the PCs are sold is displayed through the web browser 30, similar to FIGS. 3A to 3D. The screen of the web page displayed through the web browser 30 transitions from the screen in FIG. 4A to the screen in FIG. 4C when the screen is scrolled down.

The detection unit 42 detects a scroll operation for the screen on which the web page is displayed. The determination unit 43 obtains an average speed of the scroll operation for each of specific ranges of the web page displayed on the screen, from a history of the scroll operation for the screen, which has been detected by the detection unit 42. In addition, the determination unit 43 determines whether there is a range in which an average speed of the scroll operation is reduced as compared with the other ranges. For example, in the cases of FIGS. 4A to 4C, the determination unit 43 obtains an average speed of the scroll operation for each of specific ranges, for example, each ⅕ range of the screen. In addition, the determination unit 43 determines whether there is a range in which an average speed of the scroll operation is reduced as compared with the other ranges.

When there is a range in which an average speed of the scroll operation is reduced as compared with the other ranges as a result of the determination by the determination unit 43, the change unit 44 performs change so that a link to a web page related to a content displayed in the range in which the average speed of the scroll operation is reduced as compared with the other ranges is displayed. For example, when an average speed of the scroll operation in a range including "laptop PC list" is reduced as compared with the other ranges, as illustrated in FIG. 4D, the change unit 44 displays a link to a web page of "laptop PC list" by a popup 88.

Here, when the user refers to a web page, the user scrolls the displayed web page from the top. In such a case, a scroll speed tends to be reduced in a part on which a content that interests the user is displayed. Therefore, when there is a range in which an average speed of the scroll operation is reduced as compared with the other ranges, the information processing device 12 displays a link to a web page related to a content displayed in the range in which the average speed of the scroll operation is reduced as compared with the other ranges. As a result, the information processing device 12 may guide the user to the web page of the content in which the user is interested and suppress the departure of the user from the web site. That is, the information processing device 12 may take a measure corresponding to an operation of each of the users who refer to the web page based on an operation pattern when the user refers to the web page.

Figures 5A, 5B, 5C, 5D, 5E:
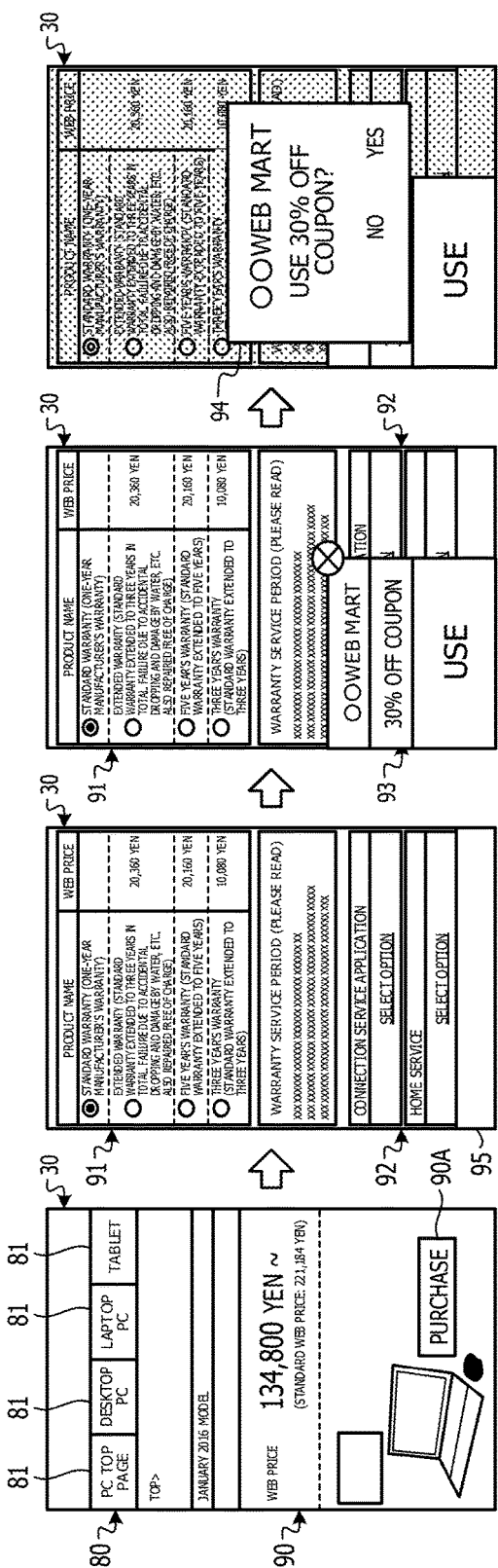
FIGS. 5A to 5E are diagrams illustrating an example of a screen on which a web page is displayed.

FIGS. 5A to 5E are diagrams illustrating an example of a screen on which a web page is displayed. In FIGS. 5A to 5E, an example is illustrated in which a web page through which an individual PC is sold as a product is displayed through the web browser 30. The screen of the web page displayed through the web browser 30 transitions from the screen in FIG. 5A to the screen in FIG. 5B when the screen is scrolled down. As illustrated in FIG. 5A, at the top of the web page, the header part 80 is provided, and similar to FIG. 3A, the selection areas 81 of "PC top page", "desktop PC", "laptop PC", and "tablet" are provided.

In addition, as illustrated in FIGS. 5A and 5B, in the web page, a product area 90 including the price of a product and a purchase button 90A is provided. The purchase button 90A accepts an operation in which purchase is instructed from the user, and is used to execute processing in which the product is purchased when the purchase button 90A has been selected. In addition, in the web page, a warranty selection area 91 in which a warranty applied to the product is selected and an option selection area 92 in which an option applied to the product is selected are provided.

The detection unit 42 detects a scroll operation for the screen on which the web page is displayed. The detection unit 42 obtains a time taken for the scroll operation of a specific range of the screen, from a history of the scroll operation for the screen, which has been detected by the detection unit 42. In addition, the detection unit 42 determines whether the time taken for the scroll operation of the specific range becomes a specific time period or more. For example, the detection unit 42 determines whether the scroll operation in a third range including one or both of a range of the price of the product and a range of an operation target used to instruct purchase of the product has been performed for the specific time or more, from the history of the scroll operation for the screen. The range of the operation target used to instruct the purchase of the product may be, for example, a range including an operation unit used to instruct the purchase of the product such as the purchase button 90A. In addition, the detection unit 42 determines whether the scroll operation in the third range has been performed less than the specific time period, and the scroll operation has been performed on a part that is lower than the third range. For example, the detection unit 42 determines whether the scroll operation in the range of the product area 90 has been performed for the specific time period or more. In addition, the detection unit 42 determines whether the scroll operation in the range of the product area 90 has been performed for less than the specific time period, and the scroll operation has been performed on a part that is lower than the range of the product area 90.

Figure 6:
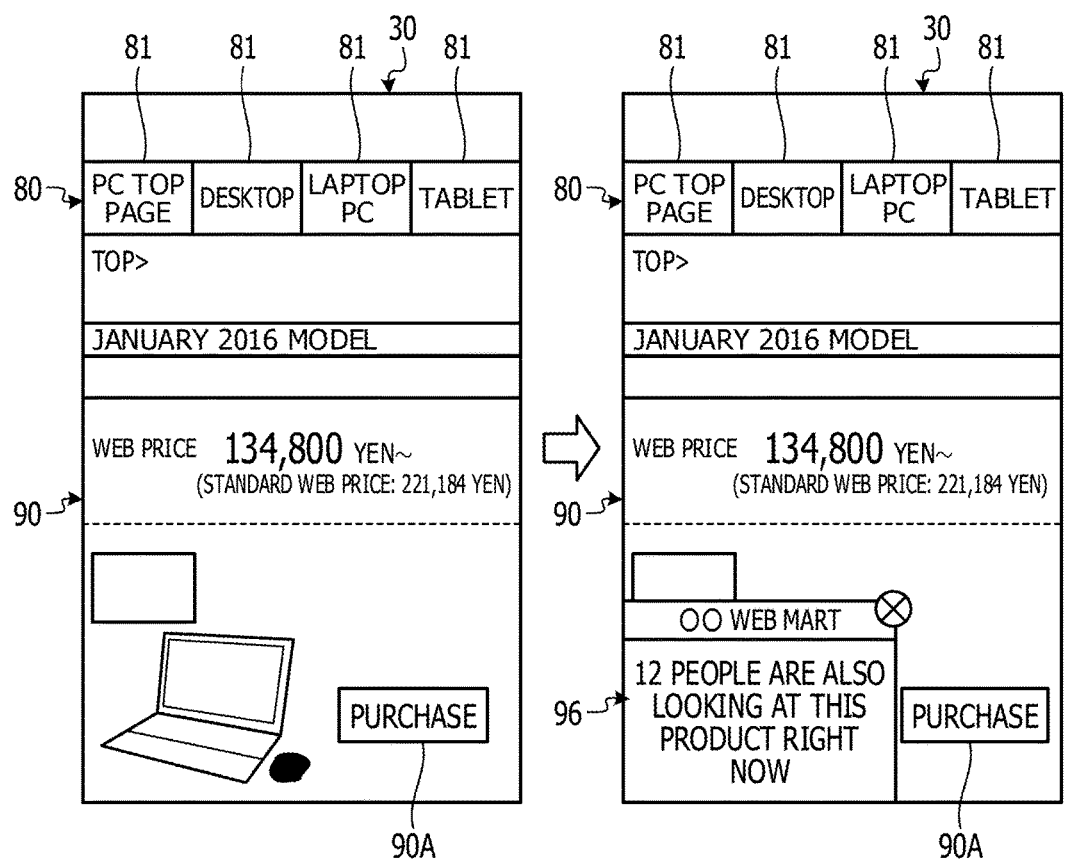
FIG. 6 is a diagram illustrating an example of a screen on which the web page is displayed.

When the scroll operation in the third range has been performed for the specific time period or more, the change unit 44 performs change so that the number of users who are considering purchasing the product is displayed (FIG. 6). In addition, when the scroll operation in the third range has been performed for less than the specific time period, and the scroll operation has been performed on a part that is lower than the third range, the change unit 44 performs change so that a coupon used to discount the price of the product is displayed (FIGS. 5A to 5E).

For example, in the case of FIGS. 5A and 5B, the determination unit 43 determines whether a time taken for the scroll operation in the range of the product area 90 including the price of the product is the specific time period or more. In addition, the determination unit 43 determines whether the scroll operation in the range of the product area 90 has been performed for less than the specific time period, and the scroll operation has been performed on a part that is lower than the range of the product area 90. It is assumed that the specific time period is, for example, 15 seconds.

When the scroll operation in the range of the product area 90 has been performed for less than the specific time period, and the scroll operation has been performed on the part that is lower than the range of the product area 90, as illustrated in FIG. 5C, the change unit 44 displays the coupon used to discount the price of the product by a popup 93. The change unit 44 may perform change so that the coupon used to discount the price of the product is displayed on the web page displayed on the screen. The change unit 44 may display the coupon used to discount the price of the product with information used to encourage the user to purchase the product such as information indicating that an inventory quantity is insignificant.

When the user selects the coupon of the popup 93, as illustrated in FIG. 5D, a popup 94 used to select whether the coupon is used is displayed on the web page. When the selection is performed so that the coupon is used, as illustrated in FIG. 5E, information indicating that the coupon is being activated is displayed on an area 95 at the bottom of the web page.

FIG. 6 is a diagram illustrating an example of a screen on which the web page is displayed. Similar to FIGS. 5A to 5E, in FIG. 6, an example is illustrated in which the web page through which the individual PC is sold as the product is displayed through the web browser 30.

For example, in the case of FIG. 6A, the determination unit 43 determines whether a time taken for the scroll operation in the range of the product area 90 including the price of the product is the specific time period or more. In addition, the determination unit 43 determines whether the scroll operation in the range of the product area 90 has been performed for less than the specific time period, and the scroll operation has been performed on a part that is lower than the range of the product area 90. It is assumed that the specific time period is, for example, 15 seconds.

When the scroll operation in the range of the product area 90 has been performed for the specific time period or more, as illustrated in FIG. 6B, the change unit 44 displays the number of users who are considering purchasing the product in the product area 90 by a popup 96. Here, in the analysis server 11, the number of times in which the web page of the product has been displayed is counted for each day, and the number of times in which the web page has been displayed is set as the number of users who are considering purchasing the product in the product area 90. The change unit 44 may perform change so that the number of users who are considering purchasing the product is displayed on the web page displayed on the screen.

Here, the user compares and considers purchasing the products on the web pages by scrolling the web pages of the compared products and referring to the prices and the conditions. Therefore, when the scroll operation in the range of the product area 90 has been performed less than the specific time period, and the scroll operation has been performed on the part that is lower than the range of the product area 90, as illustrated in FIG. 5C, the information processing device 12 displays the coupon used to discount the price of the product by the popup 93. In addition, when the user is considering purchasing the product in the displayed web page, there is a tendency in which the range of the product area 90 is displayed for a long time because the user compares the prices and the specifications of products and considers purchasing the products. Therefore, when the scroll operation in the range of the product area 90 has been performed for the specific time period or more, as illustrated in FIG. 6B, the information processing device 12 displays the number of users who are considering purchasing the product in the product area 90 by the popup 96. As a result, the information processing device 12 may motivate the user who is considering purchasing the product to purchase the product, and encourage the user to purchase the product. That is, the information processing device 12 may take a measure corresponding to an operation of each of the users who refer to the web page, based on an operation pattern when the user refers to the web page.

As a technology by which an advertisement is displayed on a web page, for example, a behavioral targeting advertisement is known. In the behavioral targeting advertisement, an advertisement is displayed for a customer who is an advertisement target when interests of customers are estimated based on behavior histories of the customers, and the targets are narrowed down. For example, in the behavioral targeting advertisement, a cookie is stored in a browser of the user who had referred to the web page. In addition, in the behavioral targeting advertisement, in a case where the cookie is obtained from the browser when the user accesses the same web page again, an advertisement is displayed corresponding to the interest of the user, which is obtained when the user refers to the web page before.

However, in the behavioral targeting advertisement, when the user refers to the web page for the first time, a cookie of the user is not previously obtained. Therefore, in the behavioral targeting advertisement, when the user refers to the web page for the first time, it is difficult to display an advertisement corresponding to the interest of the user. That is, in the behavioral targeting advertisement, it is difficult to take a measure corresponding to each of the users when the user visits the web page for the first time.

In addition, the information processing device 12 estimates the interest of the user based on an operation pattern when the user refers to the web page, and causes an advertisement corresponds to the interest of the user to be displayed. As a result, the information processing device 12 may display the advertisement corresponding to the interest of the user even when the user refers to the web page for the first time. That is, the information processing device 12 may take a measure corresponding to each of the users even when the user visits the web page for the first time.

Figure 7:
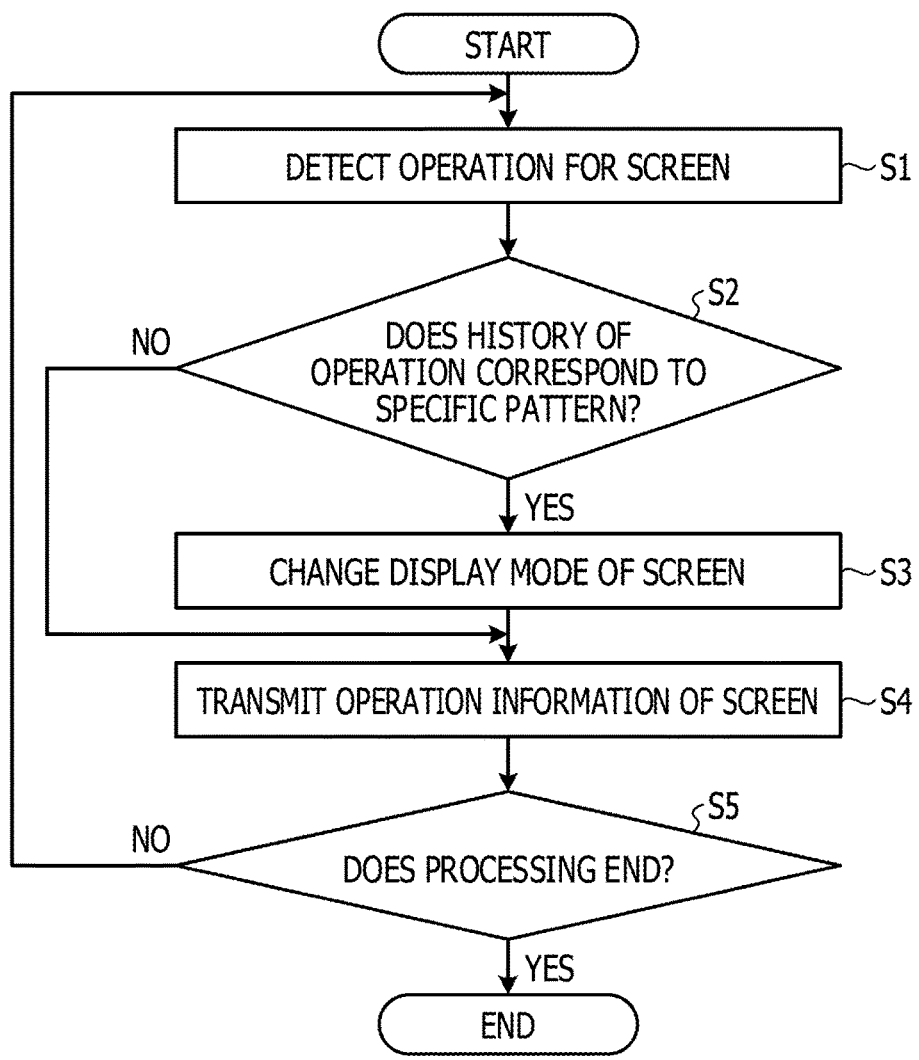
FIG. 7 is a flowchart illustrating an example of display control processing according to the embodiment.

Display control processing in which the information processing device 12 controls display of an advertisement is described below. FIG. 7 is a flowchart illustrating an example of the display control processing according to the embodiment.

The detection unit 42 detects an operation for a screen on which a web page is displayed, based on operation information from the operation unit 22 (Step S1). For example, the detection unit 42 detects a scroll operation for the screen on which the web page is displayed.

The determination unit 43 determines whether a history of the operation detected by the detection unit 42 corresponds to a specific pattern (Step S2). For example, the determination unit 43 obtains a flow line of the operation on the screen on which the web page is displayed, from the history of the operation detected by the detection unit 42. In addition, the determination unit 43 determines whether the flow line of the operation corresponds to the specific pattern. When the flow line of the operation does not correspond to the specific pattern (No in Step S2), the flow proceeds to Step S4 described later.

In addition, when the flow line of the operation corresponds to the specific pattern (Yes in Step S2), the change unit 44 changes the display mode of the screen displayed on the display unit 21 (Step S3).

The transmission unit 45 transmits the operation information for the screen, to the analysis server 11 (Step S4).

The detection unit 42 determines whether end of the processing has been instructed (Step S5). When end of the web browser 30 has been instructed, the detection unit 42 determines that end of the processing has been instructed. When end of the processing has been instructed (Yes in Step S5), the processing ends.

In addition, when end of the processing has not been instructed (No in Step S5), the flow returns to Step S1.

As described above, the information processing device 12 detects an operation for the screen on which the web page is displayed. The information processing device 12 determines whether a history of the operation detected from a single web page or a plurality of web pages corresponds to the specific pattern. The information processing device 12 changes the display mode of the screen when the history of the operation corresponds to the specific pattern. As a result, the information processing device 12 may control a display screen corresponding to an operation history of each of the users.

In addition, the information processing device 12 performs change so that information stored in the storage unit 23 in association with the specific pattern is displayed on the screen as a popup display. Alternatively, the information processing device 12 perform change so that the information stored in the storage unit 23 in association with the specific pattern is displayed on the web page displayed on the screen. As a result, the information processing device 12 may provide the information associated with the specific pattern for the user.

In addition, the information processing device 12 detects a scroll operation for the screen. The information processing device 12 obtains an average speed of the scroll operation for each specific range of the web page displayed on the screen, from the history of the scroll operation for the screen. The information processing device 12 determines whether the average speed of the scroll operation for the specific range corresponds to the specific pattern. As a result, the information processing device 12 may estimate a state of interest of each of the users.

In addition, the information processing device 12 determines whether the average speed of the scroll operation for each of the specific ranges in the web page increases in a second range as compared with a first range. When the information processing device 12 determines that the average speed of the scroll operation increases in the second range as compared with the first range, the information processing device 12 performs change so that a link to a content of a specific category is displayed. As a result, the information processing device 12 may display the link to the content of the specific category, for the user who is interested in the specific category.

In addition, the information processing device 12 determines whether there is a range in which the average speed of the scroll operation is reduced as compared with the other ranges. When there is the range in which the average speed of the scroll operation is reduced as compared with the other ranges, the information processing device 12 performs change so that a link to a web page related to a content displayed on the range is displayed. As a result, the information processing device 12 may cause a link to a web page of a content in which the user is interested to be displayed for the user.

In addition, the information processing device 12 performs the following determination based on the history of the scroll operation for the screen on which the web page through which the products are sold is displayed. The information processing device 12 determines, from the history of the scroll operation, whether the scroll operation in a third range including one or both of a range of the price of a product and a range of an operation target used to instruct purchase of the product in the web page displayed on the screen has been performed for a specific time period or more. In addition, when the scroll operation in the third range has been performed for the specific time period or more, the information processing device 12 performs change so that the number of users who are considering purchasing the product is displayed. As a result, the information processing device 12 may encourage the user who is considering purchasing the product in the third range to purchase the product.

In addition, the information processing device 12 determines whether the scroll operation in the third range has been performed for less than the specific time period, and the scroll operation has been performed on a part that is lower than the third range. When the scroll operation in the third range has been performed for less than the specific time period, and the scroll operation has been performed on the part that is lower than the third range, the information processing device 12 performs change so that a coupon used to discount the price of the product is displayed. As a result, the information processing device 12 may encourage the user who is considering purchasing the product in the range to purchase the product.

In addition, the analysis server 11 provides the specific pattern and change information of the display mode of the screen corresponding to the pattern, for the information processing device 12. The information processing device 12 transmits, to the analysis server 11, information on an operation detected for the screen in which the display mode has been changed. As a result, the analysis server 11 may analyze the pattern and an effect of the change in the display mode of the screen corresponding to the pattern.

In the above embodiment, the case is described in which an operation for the screen of the web site displayed through the web browser 30 is detected as a screen on which one or a plurality of contents is displayed, but the embodiment is not limited to such a case. For example, an operation for a screen including one or a plurality of contents displayed by application software operated in a PC, a smartphone, a tablet terminal, or the like may be detected, and change control of the display mode of the one or the plurality of contents in the screen of the application software may be performed. That is, the screen is not limited to a screen of a web page, and any screen may be applied as long as one or a plurality of contents is displayed on the screen. In addition, the software by which a screen of a content is displayed is not limited to the web browser 30, and any piece of software may be applied as long as one or a plurality of contents is displayed on a screen by the software. For example, the software by which a screen of a content is displayed may be application software of a smartphone that performs display of a screen by making use of a web page.

In addition, in the above-described embodiment, when "(average scroll speed in the ⅓ range)/(average scroll speed in the ⅔ range)≤0.5" is satisfied, it is assumed that the average speed is determined to increase to the bottom of the web page as compared with the top of the web page, but the embodiment is not limited to such a case. For example, the change unit 44 may determine that the average speed increases at the bottom of the web page as compared with the top of the web page when "0.5<(average scroll speed in the ⅔ range)/(average scroll speed in the ⅓ range)" is satisfied. In addition, the change unit 44 may display a link to the most referenced product as an advertisement in an operation history including the transition recently led to a KGI, as the web page of the specific category.

In addition, in the above embodiment, a pattern used to display an advertisement and information on the displayed advertisement are described as a source code in the display control program so as to be associate with each other, but the embodiment is not limited to such a case. For example, the analysis server 11 may store a pattern used to display the advertisement and information on the displayed advertisement in table data so as to be associated with each other, and transmit the table data and the display control program to the information processing device 12. In the information processing device 12, the display control program is operated on the web browser 30, and whether a history of an operation corresponds to any pattern stored in the table data may be determined with reference to the table data.

In addition, in the above-described embodiment, it is assumed that an operation for the screen such as a touch operation is detected, but the embodiment is not limited to such a case. For example, the sight position of the user is detected, and an operation for the screen may be detected using a part on the screen at the sight position has been focused as an operation part for the screen. For example, the determination unit 43 may measure a time in which the sight position has been focused, for each specific range of the web page, and determine whether the time in which the sight position has been focused for the specific range corresponds to the specific pattern.

In addition, the configuration elements of the illustrated units may not be configured as physically illustrated above. That is, a specific configuration of distribution and combination of the units are not limited to the illustrated configuration, and all or part of the configuration elements may be configured so as to be functionally or physically distributed or combined depending on various loads, usages, and the like in a certain unit of configuration elements. In addition, the illustrated pieces of processing are not limited to the above-described order and may be executed at the same time in a range in which the processing content is not contradicted, and the execution order of the pieces of processing may be changed.

In addition, all or part of the various processing functions executed in the devices may be executed on a CPU (or a microcomputer such as a MPU or a micro controller unit (MCU)). In addition, all or part of the various processing functions may be executed on a program analyzed and executed on the CPU (or the microcomputer such as the MPU or the MCU) or hardware by wired logic.

Figure 8:
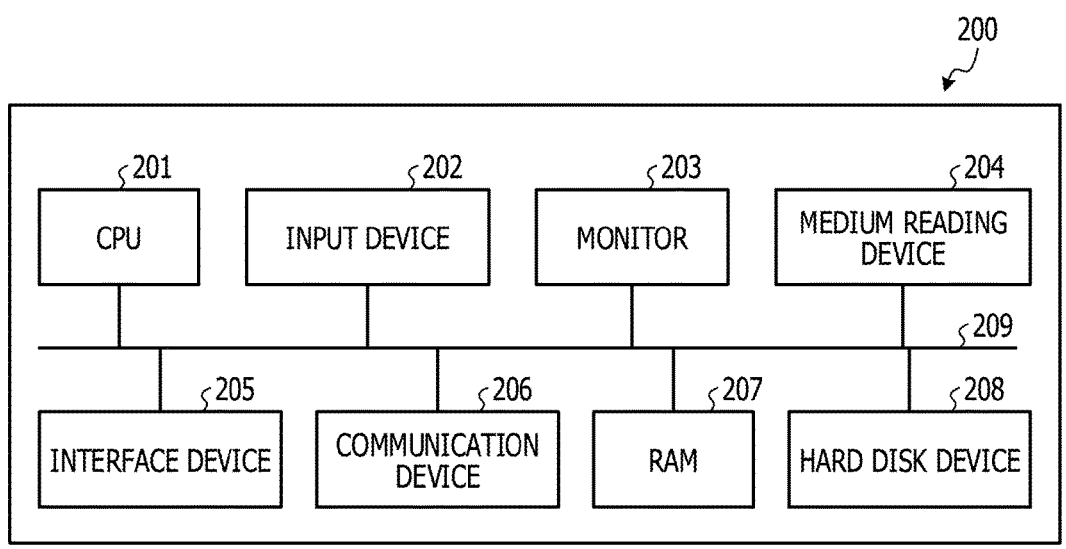
FIG. 8 is a diagram illustrating an example of a computer that executes a display control program.

The various pieces of processing described in the above embodiment may be realized when a program prepared in advance is executed by a computer. Therefore, in the following description, an example of a computer that executes a program having a function similar to that of the above-described embodiment is described. FIG. 8 is a diagram illustrating an example of a computer that executes a display control program.

As illustrated in FIG. 8, a computer 200 includes a CPU 201 that executes various pieces of calculation processing, an input device 202 that accepts data inputs, and a monitor 203. In addition, the computer 200 includes a medium reading device 204 that reads a program or the like from a storage medium, an interface device 205 used to couple the computer 200 to various devices, and a communication device 206 used to couple the computer 200 to another information processing device or the like through a wired communication or a wireless communication. In addition, the computer 200 includes a RAM 207 that temporarily stores various pieces of information and a hard disk device 208. In addition, the devices 201 to 208 are coupled to each other through a bus 209.

In the hard disk device 208, the display control program is stored that has functions similar to those of the processing units such as the detection unit 42, the determination unit 43, the change unit 44, and the transmission unit 45 illustrated in FIG. 2. In addition, in the hard disk device 208, various pieces of data used to realize the display control program are stored. The input device 202 accepts, for example, inputs of pieces of various information such as pieces of operation information from the user of the computer 200. The monitor 203 displays, for example, various screens such as display screens for the user of the computer 200. To the interface device 205, for example, a printing device and the like are coupled. The communication device 206 includes, for example, a function similar to the communication unit 20 illustrated in FIG. 2, is coupled to the web server 10 and the analysis server 11, and transmits and receives various pieces of information to and from the web server 10 and the analysis server 11.

The CPU 201 executes various pieces of processing by reading programs stored in the hard disk device 208, deploying the programs to the RAM 207, and executing the programs. In addition, these programs may cause the computer 200 to function as the detection unit 42, the determination unit 43, the change unit 44, and the transmission unit 45 illustrated in FIG. 2.

The above-described display control program may not be stored in the hard disk device 208. For example, the display control program stored in a storage medium allowed to be read by the computer 200 may be read and executed by the computer 200. The storage medium allowed to be read by the computer 200 corresponds to, for example, a portable recording medium such as a compact disc-read-only memory (CD-ROM), a digital versatile disk (DVD), or a universal serial bus (USB) memory, a semiconductor memory such as a flash memory, a hard disk drive, or the like. In addition, such a display control program may be stored in a device coupled to a public line, the Internet, a LAN, or the like, read from the portable recording medium, the semiconductor memory, the hard disk drive, or the like, and executed by the computer 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a display control program that causes a computer to execute a process, the process comprising:

monitoring an operation of a user for a specific display content displayed on a screen;

determining whether a result of the monitoring corresponds to at least one of a plurality of operation patterns stored in a memory in association with the specific display content, each of the plurality of operation patterns being associated with pieces of information corresponding to the specific display content, respectively; and outputting, on the screen, information, among from the pieces of information, corresponding to the at least one of the plurality of operation patterns when the result of the monitoring corresponds to the at least one of the plurality of operation patterns, the information being different in accordance with which of the plurality of operation patterns the at least one of a plurality of operation patterns is.

2. The non-transitory computer-readable storage medium according to claim 1, wherein the outputting outputs the information as a popup display.

3. The non-transitory computer-readable storage medium according to claim 1, wherein the operation is a scroll operation, and wherein the process further comprises:
  calculating a scroll speed of the scroll operation;
  specifying an operation pattern corresponding to the calculated scroll speed among from the plurality of operation patterns, the plurality of operation patterns indicating different scroll speeds that are associated with different information to be displayed, respectively; and
  the outputting outputs the information determined based on the specified operation pattern.

4. The non-transitory computer-readable storage medium according to claim 3, wherein the calculating further calculates an average scroll speed of each of a plurality of scroll ranges on the screen on which the one or the plurality of contents is displayed, and each of the plurality of operation patterns including a different combination of the average scroll speed of each of specific ranges.

5. The non-transitory computer-readable storage medium according to claim 4, wherein the plurality of operation patterns include an operation pattern indicating that an average scroll speed of a first range of the plurality of scroll ranges is faster than an average scroll speed of a second range of the plurality of scroll ranges, the first range being located on a side of a bottom of a web page which displays the one or the plurality of contents on the screen and the second range being located on a side of a top of the web page.

6. The non-transitory computer-readable storage medium according to claim 4, wherein the plurality of operation patterns include an operation pattern indicating that an average scroll speed of a third range, included in the plurality of scroll ranges, is slower than the plurality of scroll ranges other than the third range, the operation pattern being associated with information corresponding to a display content included in the third range.

7. The non-transitory computer-readable storage medium according to claim 4, wherein the one or the plurality of contents are displayed in a web page through which a product is sold, and the plurality of operation patterns include an operation pattern indicating that the scroll operation in a fourth range, included in the plurality of scroll ranges, is performed for a specific time period or more in the web page displayed on the screen, the fourth range including at least one of a price of the product and an operation target that instructs purchase of the product, the operation pattern being associated with information indicating a number of users that are considering purchasing the product.

8. The non-transitory computer-readable storage medium according to claim 7, wherein the plurality of operation patterns include an operation pattern indicating that the scroll operation in the fourth range is performed less than the specific time period and the scroll operation is performed on a part that is located on a side of a bottom of the web page than the fourth range, the operation pattern being associated with information corresponding to a coupon that discounts the price of the product.

9. The non-transitory computer-readable storage medium according to claim 1, wherein the process comprises: transmitting the result of the monitoring to an external server that includes the memory; and receiving, from the external server, the information corresponding to the result of the monitoring.

10. The non-transitory computer-readable storage medium according to claim 1, wherein the monitoring monitors the operation of the user during a current viewing period of the one or the plurality of contents displayed on the screen.

11. A display control method that causes a computer to execute a process, the process comprising:
  monitoring an operation of a user for a specific display content displayed on a screen;
  determining whether a result of the monitoring corresponds to at least one of a plurality of operation patterns stored in a memory in association with the specific display content, each of the plurality of operation patterns being associated with pieces of information corresponding to the specific display content, respectively; and
  outputting, on the screen, information, among from the pieces of information, corresponding to the at least one of the plurality of operation patterns when the result of the monitoring corresponds to the at least one of the plurality of operation patterns, the information being different in accordance with which of the plurality of operation patterns the at least one of a plurality of operation patterns is.

12. An information processing device comprising:
  a memory that stores a plurality of operation patterns; and
  a processor coupled to the memory and the processor configured to execute a process, the process including:
    monitoring an operation of a user for a specific display content displayed on a screen;
    determining whether a result of the monitoring corresponds to at least one of the plurality of operation patterns stored in the memory in association with the specific display content, each of the plurality of operation patterns being associated with pieces of information corresponding to the specific display content, respectively; and
    outputting, on the screen, information, among from the pieces of information, corresponding to the at least one of the plurality of operation patterns when the result of the monitoring corresponds to the at least one of the plurality of operation patterns, the information being different in accordance with which of the plurality of operation patterns the at least one of a plurality of operation patterns is.

* * * * *